Figure 1:
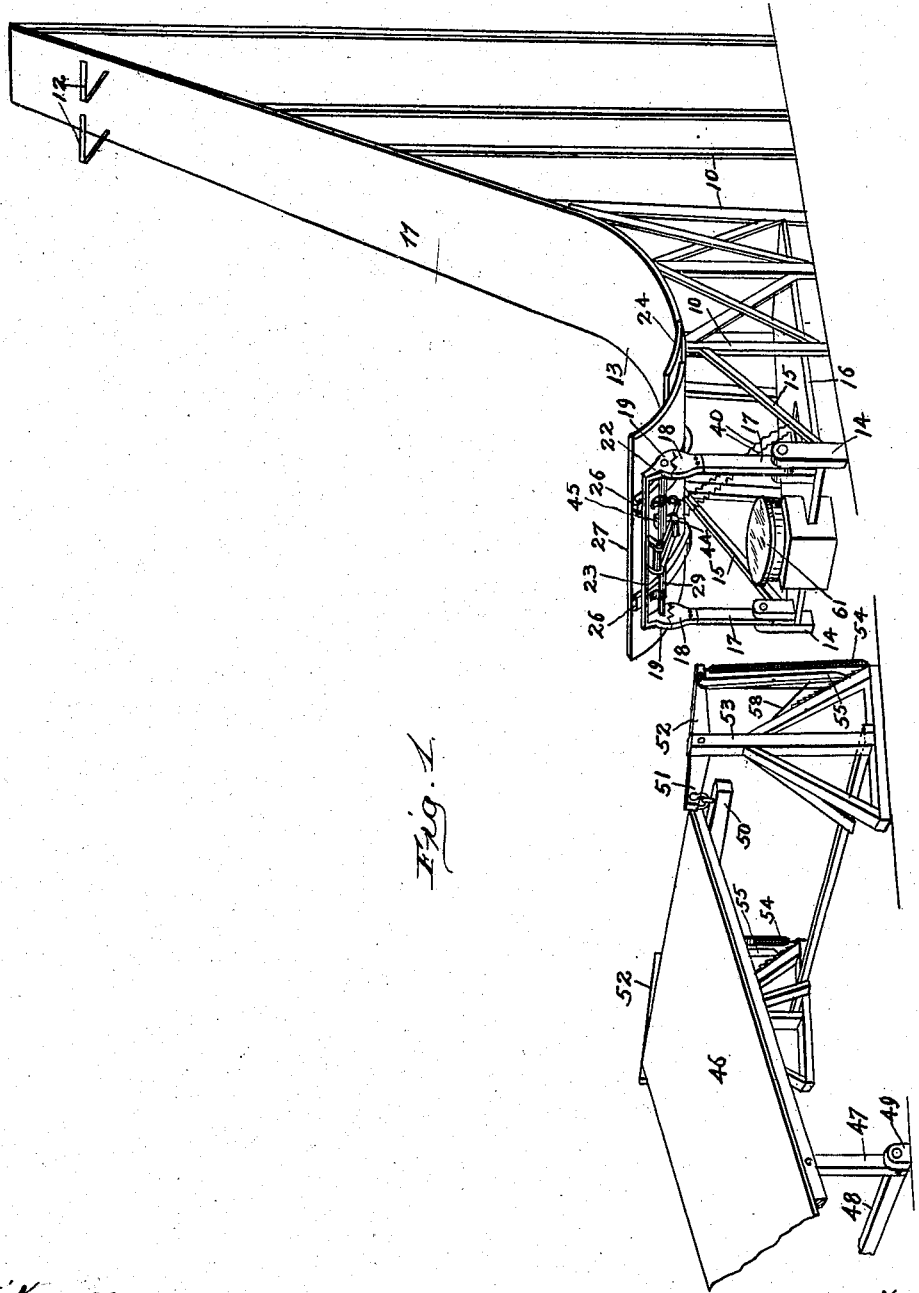

R. TOSSELL & J. RUEL.
AMUSEMENT APPARATUS.
APPLICATION FILED AUG. 12, 1908.

918,797.

Patented Apr. 20, 1909.
3 SHEETS—SHEET 1.

Witnesses:
Chas. E. Gorton,
H. A. Nyman

Inventors
Richard Tossell
And John Ruel.
By Chas. C. Tillman
Atty.

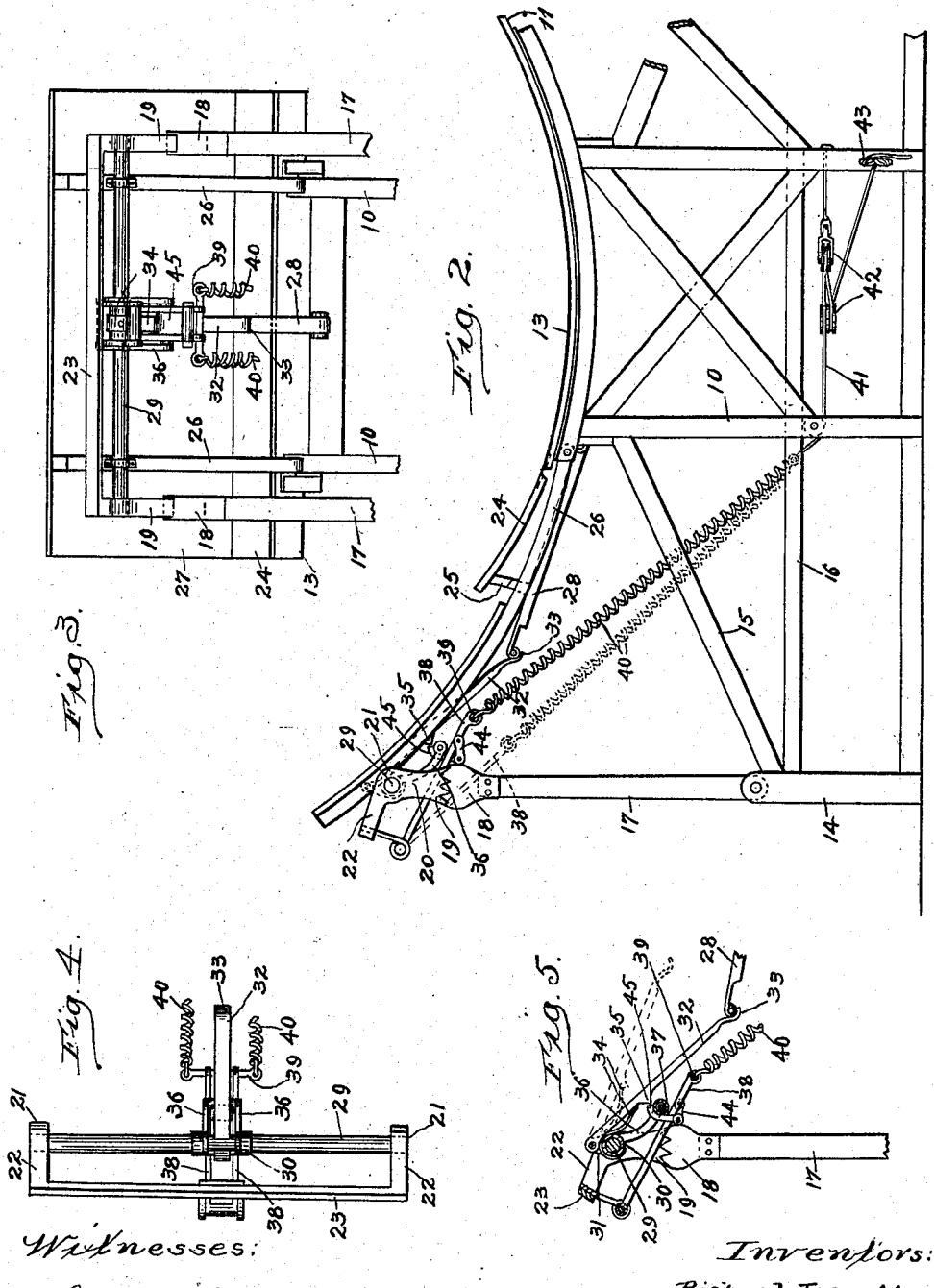

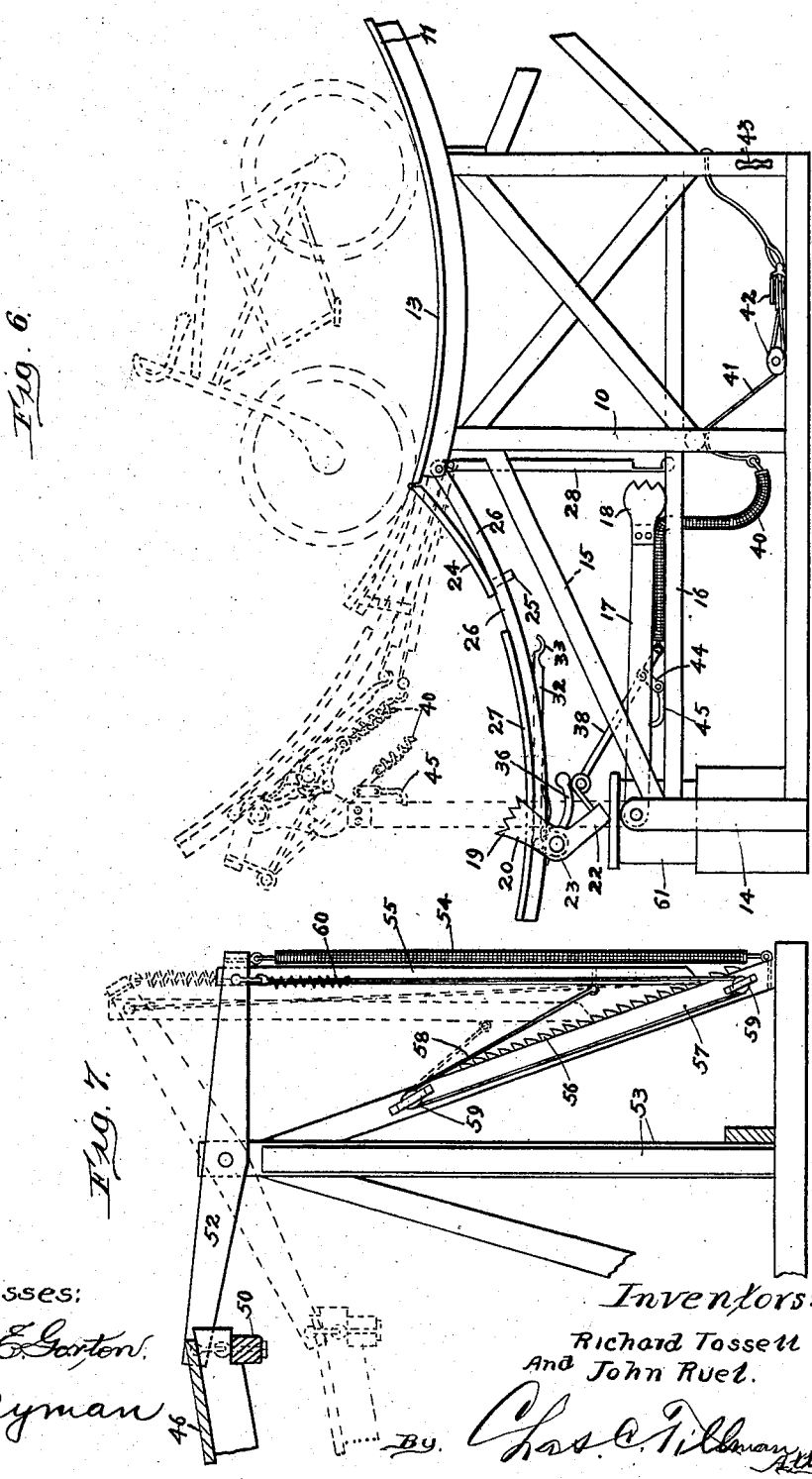

UNITED STATES PATENT OFFICE.

RICHARD TOSSELL AND JOHN RUEL, OF CHICAGO, ILLINOIS.

AMUSEMENT APPARATUS.

No. 918,797.  Specification of Letters Patent.  Patented April 20, 1909.

Application filed August 12, 1908. Serial No. 448,084.

*To all whom it may concern:*

Be it known that we, RICHARD TOSSELL and JOHN RUEL, citizens of the United States, residing at Chicago, in the county of Cook and State of Illinois, have invented certain new and useful Improvements in Amusement Apparatus, of which the following is a specification.

This invention relates to improvements in an amusement apparatus of that type or class in which an inclined chute or way is employed, over which a vehicle under control of a rider or operator is adapted to travel and caused to turn a somersault, and it consists in certain peculiarities of the construction, novel arrangement and operation of the various parts thereof as will be hereinafter more fully set forth and specifically claimed.

The principal object of our invention is to provide an apparatus of the above-named general character, which shall be simple and inexpensive in construction, strong, durable, efficient, safe and automatic in certain steps of its operation, and of such a nature as to cause a vehicle of any suitable kind, but preferably, a bicycle or automobile, to arise therefrom and in its progress to turn a backward somersault from the lower portion of the chute or way, and to alight on a landing platform portion of the way, which is spaced from the main track or way and thus providing means for performing a hazardous and highly sensational act with comparative safety to the rider or operator.

Another object of the invention is to provide means for conducting the vehicle in the proper direction in its progress and under the momentum acquired down the inclined way to cause it, or assist the operator in causing it to turn a backward somersault across the gap or chasm formed between the lower end of the main track or way and the landing platform portion thereof.

A further object is to provide means whereby the landing platform portion of the way will have a yielding action, so as to overcome the rebound of the vehicle when it alights thereon.

A still further object of the invention is to provide means for preventing the rebound of the movable section or trap located at the lower portion of the main way or track and to prevent injury to certain parts of the mechanism.

Numerous other objects and advantages of our invention will be disclosed in the subjoined description and explanation.

In order to enable others skilled in the art to which our invention pertains to make and use the same, we will now proceed to describe it, referring to the accompanying drawings, in which—

Figure 1 is a perspective view of an amusement apparatus embodying our invention showing the parts in the positions they will occupy when ready for the passage of the vehicle thereover and in order to cause it to turn a backward somersault and in order to provide the yielding platform portion for it to alight upon. Fig. 2 is an enlarged view in side elevation of the lower portion of the main way or chute showing the movable section and operating parts therefor by continuous lines in their normal positions, or the positions they will assume when ready for the vehicle to pass thereover. Fig. 3 is an end view of a portion of the supporting frame and of the parts shown in Fig. 2. Fig. 4 is a plan view of the front portion of the supporting frame for the movable section of the way or chute. Fig. 5 is a view partly in section and partly in elevation of the parts shown in Fig. 4. Fig. 6 is an enlarged view in side elevation of the front or lower portion of the main way or chute, showing by dotted lines the normal positions of the parts as well as the positions thereof when in the act of releasing the trap or movable section by reason of the passage of a vehicle, such as a bicycle thereover and by continuous lines the positions the parts may assume after the movable section or trap has been released and lowered, and Fig. 7 is an enlarged view in side elevation and partly in section of a portion of the landing platform and yielding support therefor.

Like numerals of reference refer to corresponding parts throughout the different views of the drawings.

The reference numeral 10 designates a suitable frame-work on which is mounted the main portion of an inclined way or chute 11 which may be made of any suitable size and material and preferably has at its upper portion two spaced apart brackets or small platforms 12, on which the rider of a bicycle may stand while preparing to mount the same before starting it on its descent down the inclined way. The lower portion of the way or chute is supported on the front portion of the frame-work 10 and is curved upwardly to any desired extent as shown at 13 in order to direct the vehicle upwardly from the front end of the way or chute.

Located directly in front of the forward part of the frame-work 10 are two uprights 14, which are preferably secured to the front part of the frame-work 10 by means of braces 15 and floor 16 or other suitable connection which extends longitudinally and horizontally of the frame-work 10 and at the lower portion thereof. As shown the uprights 14 are shorter than the front uprights of the frame-work 10 and that each has pivotally secured to its upper portion an upright member 17 each of which is provided at its upper end with a toothed or segmental rack 18 to mesh with similar racks 19 on the lower members 20 of two bell-crank-levers 21, the upper members 22 of which are transversely united at their free ends by means of a bar 23 as is clearly shown in Figs. 3 and 4 of the drawings.

Hinged at its rear portion to the front part of the chute or way 11 is a transversely extended leaf or door 24 which is preferably curved on an arc to correspond with the arc of the lower portion 13 of the chute. The leaf or door 24 has on its front lower portion at about the middle thereof a downward extension 25 which projects between two rearwardly extending arms 26 secured in parallelism with one another on the lower surface of the trap or movable section 27 which as well as said arms are upwardly and forwardly curved as shown, and said arms 26 which form a part of the trap or movable section 27 are pivotally secured at their rear ends to the front portion of the upper part of the frame-work 10 and are spaced so as to occupy positions near the side edges of the trap 27 or movable section.

Pivotally secured at its free end to the upper portion of the front part of the frame-work 10 is a forwardly extending bar 28 which projects directly under the extension 25 on the leaf or door 24 and normally supports the same in about the positions shown in Figs. 1 and 2 of the drawings. Transversely journaled on the arms or ribs 26 near their front ends is a shaft 29 on the ends of which are rotatably mounted the bell-crank-levers 21, which are transversely united by means of the bar 23 as before stated.

Secured on the shaft 29 at about its middle is a collar 30 which has an upwardly extending lug 31 to which is pivotally secured at one of its ends an arm 32, which has its other end provided with a curved portion 33 to engage the front end of the lever 28 as will be clearly understood by reference to Figs. 2 and 5 of the drawings. The arm 32 is pressed by a spring 34 which is secured at one of its ends to the collar 30 and has its other end in engagement with the arm 32 which arm is provided at about its middle with a depending projection 35 for the purpose to be presently explained.

Mounted on the shaft 29 and extending rearwardly and downwardly therefrom are two arms 36 which are located on each side of the collar 30 and have their lower ends connected by a transverse portion or roller 37, which is normally located directly under the projection 35 on the arm 32. Depending from about the middle of the bar 23 and extending forwardly beneath the shaft 29 and arms 36 thereon is a bracket which consists of two parallel members 38, which are united at their free ends by means of a cross-piece 39 which has at each of its ends an eye to engage one end of springs 40, the other ends of which are connected to a rope or cable 41, which is equipped with a suitable block and tackle 42 and may have one of its ends secured to a cleat 43 on the frame-work.

Pivotally secured to each of the members 38 near their lower ends is a link 44 which have pivotally secured thereto a hooked trigger 45 to engage the roller or portion 37 on the arms 36 so as to hold the movable section 27 in its normal position as shown in Figs. 1 and 2 of the drawings.

Located directly in front of the lower portion of the main chute or way 11 and at a suitable distance therefrom is a landing platform 46 which is supported in a forwardly inclined position by means of uprights 47, which are pivotally secured at their upper ends to the sides of the platform and have their lower ends secured on a rocking-bar 48, the ends of which are journaled in suitable bearings 49 so as to afford a rocking or pivotal movement to said bar. The uprights 47 are connected to the platform 46 at any suitable distance from its rear end and it will be understood that the front end of said platform will extend to the ground or floor on which the structure is erected. The rear end of the platform 46 is supported on a cross-bar 50 which is loosely connected by means of links 51 at each of its ends to beams 52 which are pivotally mounted on uprights 53 on each side of the platform. As shown, the beams 52 extend longitudinally with respect to the platform and chute and have connected to their rear ends the upper ends of springs 54, the lower ends of which are secured to a portion of the supporting frame of the platform. Pivotally secured at its upper end to each of the beams 52 near its rear end is a downwardly extending bar 55 which has its lower ends beveled or pointed as shown in Fig. 7 to engage the teeth of a rack-bar 56 one of which is secured on a brace 57 of the supporting frame for the platform, located on each side thereof or directly under the beams.

Secured at one of its ends to each of the bars 55 near its lower end is a rope or cable 58 which are extended around suitable pulleys 59 mounted on the braces 57 and said ropes have their upper ends connected to tension springs 60 which are secured at their upper ends to the rear portions of the pivoted beams. Directly below the movable section 27 of the main part of the chute or way is located a buffer 61, which may be of the ordinary or any well-known construction and is employed to prevent the re-bound of the movable section as well as injury to the parts of the operating mechanism therefor.

From the foregoing and by reference to the drawings it will be clearly understood and readily seen that when the parts are placed in the positions shown in Figs. 1, 2 and 7 of the drawings, the movable section or trap 27 will be held in its elevated position by reason of the springs 40, the tension of which may be regulated through the instrumentality of the block and tackle 42, or otherwise.

When in the above named positions, the rider of the bicycle or operator of the other vehicle may mount the machine from the brackets or small platform 12, or otherwise at the upper portion of the chute 11 when the same will descend on the chute rapidly and will pass over the leaf or door 24 and on to the movable section or trap 27 in which operation it is apparent that the weight of the vehicle will depress the leaf or door 24 from the position shown in Figs. 1 and 2 to that shown by dotted lines in Fig. 6 of the drawing, thus causing the lever 28 to depress the arm 32, the projection 35 on which will cause the trigger 45 to be disengaged from the roller or portion 37, thus allowing the springs 40 to exert themselves in which operation the bell-crank-levers 21 will be caused to turn on the shaft 29, thus throwing the uprights 17 by reason of the toothed racks on said uprights and levers rearwardly so as to permit the movable section or trap and the operating mechanism therefor to assume about the positions shown by continuous lines in Fig. 6 of the drawings.

As the vehicle passes down the inclined chute 11 and over the curved portion 13, it is evident that the momentum acquired will cause the machine to arise from the front portion of the main part of the chute, with a tendency in its progress to describe an arc, corresponding with that of the curved portion of the chute. As the vehicle passes over the parts 24 and 27 it is manifest that the latter portion will drop out of the way of the rear wheel or wheels thereof, thus permitting the vehicle and rider or operator to turn a backward somersault across the space between the movable section 27 and platform 46 and to land on said platform which by reason of the peculiar and novel construction of its support as above described will yield and prevent rebound.

When the vehicle shall have landed on the platform 46 it is obvious that said platform will be depressed and the beams 52 tilted so as to raise the rear ends in which operation the bars 55 will be raised on the rack bars 56 and engage the teeth thereof thus holding the rear ends of the beams in their raised positions and the platform in its lowered position.

It is obvious from the above description of our improved amusement apparatus that the device is susceptible of considerable modifications without material departure from the principles and spirit of the invention and for this reason we do not desire to be understood as limiting ourselves to the precise form and arrangement of the several parts of the apparatus as herein set forth in carrying out our invention in practice.

Having thus fully described our invention what we claim as new and desire to secure by Letters-Patent is—

1. An amusement apparatus consisting of an inclined way having its lower part upwardly curved, a movable section pivotally mounted at its rear portion at the front part of said way and normally adapted to form the terminal of the upwardly curved part of the inclined way, means to support said section in its raised position, and means to release and permit the said section to drop downwardly out of the path of the vehicle.

2. In an amusement apparatus, the combination with a landing-platform, of a longitudinally extending and spring-actuated beam pivotally supported at each side of the rear portion of the platform, a cross-bar connected to the front portions of said beams, a rack-bar located below the rear portion of each of said beams, and a pawl pivoted at its upper end to each of the beams and adapted to engage the rack-bar at its other end.

3. In an amusement apparatus, the combination with a landing-platform, of a longitudinally extending and spring-actuated beam pivotally supported near one end of said platform, means connecting the platform and said beam, a rack-bar located below the beam, and a pawl pivoted at its upper portion to said beam and carried thereby and adapted to engage the rack-bar at its lower end.

4. In an amusement apparatus, the combination with an inclined way having its lower part upwardly curved, of an upwardly curved movable section pivotally mounted at the front portion thereof, means to support said section in its raised position and to trip the same, and a buffer located beneath the movable section.

5. In an amusement apparatus, the combination with a landing-platform, of uprights pivotally secured to the sides thereof at their upper ends and pivotally supported at their lower ends, a longitudinally extending and spring actuated beam pivotally supported at each side of the rear portion of the platform, a cross-bar connected to the front portions of said beams, a rack-bar located below the rear portion of each of said beams, and a pawl pivoted at its upper end to each of the beams and adapted to engage the rack-bar at its other end.

6. In an amusement apparatus, the combination with an inclined way having its lower portion upwardly curved, of a movable section pivotally mounted at the front portion thereof, a pivoted upright located at each side of the movable section near its front end, a shaft journaled across the lower portion of the front part of the movable section, a bell-crank-lever mounted on each end of said shaft and adapted to engage the upper ends of said uprights and having a transverse connection uniting their upper members, a door hinged at one of its edges to the front part of the way and above the movable section and having a downward extension, an arm pivoted at one of its ends on said shaft and extended rearwardly under the movable section and having a downward projection, a lever pivoted at its rear end on the front portion of the way and adapted to engage at its other end the rear end of said arm, a rearward extension rigidly mounted on said shaft, a downwardly and rearwardly extended bracket mounted on the connection uniting the upper members of the bell-crank-levers and having at its rear portion a transverse part, a trigger loosely mounted on said bracket and adapted to engage means on the extension on said shaft, and a spring connected at one of its ends to said bracket and at its other end to supporting frame of the way.

7. An amusement apparatus consisting of an inclined way having its lower part upwardly curved, a movable section pivotally mounted at its rear portion at the front part of said way and normally adapted to form the terminal of the upwardly curved part of the inclined way, means to support said section in substantially the same arc as that of the curved part of the way, and means to release and permit the section to drop out of the path of the vehicle.

8. An amusement apparatus consisting of an inclined way having its lower part upwardly curved, a movable section pivotally mounted at its rear portion at the front part of said way and normally adapted to form the terminal of the upwardly curved part of the inclined way, means to support said section in its raised position, and means to drop the same while it supports a part of the weight of the vehicle.

RICHARD TOSSELL.
JOHN RUEL.

Witnesses:
  CHAS. C. TILLMAN,
  H. A. NYMAN.